Nov. 10, 1936.  W. B. CARROLL  2,060,724
SURGICAL IMPLEMENT
Filed Jan. 19, 1935
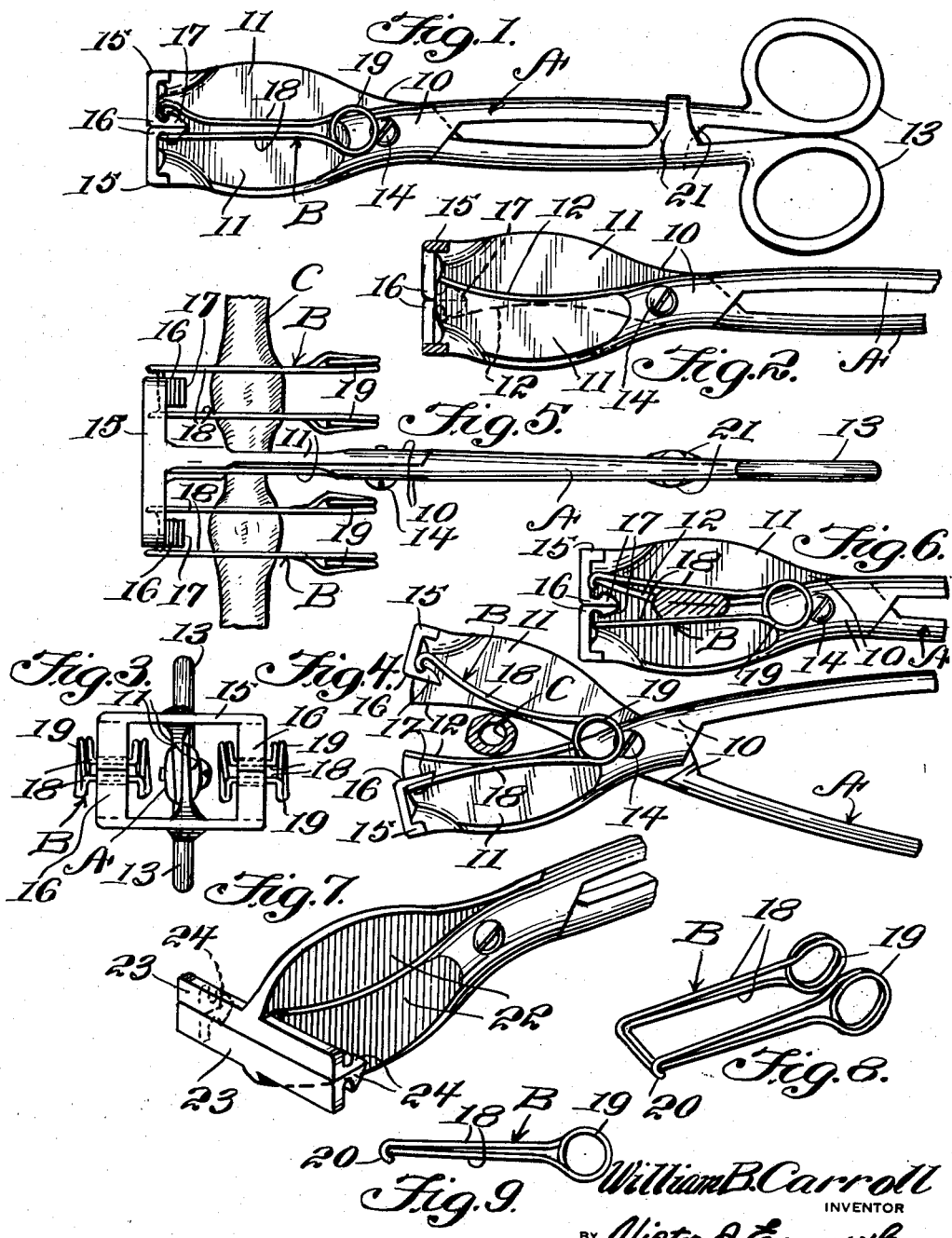

Patented Nov. 10, 1936

2,060,724

UNITED STATES PATENT OFFICE 2,060,724

SURGICAL IMPLEMENT

William B. Carroll, Okemah, Okla.

Application January 19, 1935, Serial No. 2,575

2 Claims. (Cl. 128—346)

The invention relates to a surgical implement and more especially to a combination scissors and clamping applicator for an umbilical operation.

The primary object of the invention is the provision of an implement of this character, wherein the blades of the scissors are equipped with means for the holding of clips or clamps so that the latter can be applied for clamping action upon the umbilical cord on the severance thereof simultaneously therewith and thus eliminating the usual tape tying of this cord at both sides of the point of cut thereof.

Another object of the invention is the provision of an implement of this character, wherein the clips or clamps are readily and easily mountable upon the same and when carried thereby are in a position for application instantly on the use of the scissors for the severing of the umbilical cord, the implement in its entirety being of novel construction.

A further object of the invention is the provision of an implement of this character, wherein on the closing of the blades, these will be locked in this closed relation and thus the clips or clamps as carried by the implement in their closed position upon the umbilical cord are automatically freed from the implement, thereby eliminating any manual handling of these clips for the application of the same or for removal during the cutting operation by the said implement.

A further object of the invention is the provision of an implement of this character, which is extremely simple in its construction, thoroughly reliable and efficient in its operation, strong, durable, possessing but few parts and convenient for easy handling and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of the implement constructed in accordance with the invention showing a clip or clamp carried thereby and the implement closed and latched.

Figure 2 is a fragmentary vertical longitudinal sectional view thereof.

Figure 3 is an end elevation.

Figure 4 is a fragmentary side elevation similar to Figure 1 showing the implement open and representative of an umbilical cord between its blades.

Figure 5 is an enlarged top plan view showing the severance of an umbilical cord with the clips or clamps engaged therewith at opposite sides of the point of severance.

Figure 6 is a view similar to Figure 4 showing the implement closed.

Figure 7 is a fragmentary perspective view of a modified form of the implement.

Figure 8 is a perspective view of one of the clamps.

Figure 9 is a side elevation thereof.

Similar reference characters indicate corresponding parts throughout the several views in the drawing.

Referring to the drawing in detail, the implement comprises scissors designated generally at A including the pair of bladed levers 10, the cutting blades 11 which are formed with the slightly curvilinear cutting edges 12 and eye-like handles 13, respectively. The levers 10 are pivoted at 14 in their cross relation to each other for the opening and closing of its blades 11.

Carried by the blades 11 are cross bridge pieces 15, these being preferably integral with said blades at the heel edges thereof and are formed with inwardly directed opposed jaws 16, these being disposed to coincide with the outer free ends of the blades 11 but spaced an equidistance therefrom at opposite sides of the same laterally with respect thereto. The jaws 16 are formed with cam like or spear shaped bills 17 for the quick and easy mounting of clamps or clips B thereon. Each clamp or clip B preferably is formed from a single length of wire bent on itself to provide substantially U-shaped gripping or clamping wings 18 and spring coils 19 therebetween for the tensioning of said wings 18 and urging the same in clamping or closed relation to each other. One of the wings 18 is provided with a latching nib 20 for the snapping of the other wing 18 into engagement therewith so that when this clip or clamp is biting upon the umbilical cord C it will close the latter to prevent bleeding thereof and the clip latched in this position.

The levers 10 of the scissors A adjacent to the handle ends thereof carry spring keepers 21, these serving to latch the said levers 10 when the same are actuated for the closing of the blades 11 and thus hold the scissors closed.

In Figure 7 of the drawing there is shown a slight modification wherein the blades 22 of the scissors at their free or toe ends carry the cross bars 23, these being solid in contradistinction to the bridged pieces 15 and these bars are formed with the jaws 24 identical to the jaws 16 for the mounting of the clips B thereon.

In the use of the implement for the severance of the umbilical cord C the clips B, two in number, are mounted upon the jaws 16 or 24 so that these clips or clamps B protrude rearwardly of the scissors A in substantially spaced parallel relation thereto at opposite sides of the blades 11 or 22 of the same. Now, when the scissors A are brought into a position for the operation of severing the umbilical cord C in this position the blades 11 or 22 are open and likewise the clips or clamps B have their wings 18 spread or opened so that the said clips or clamps simultaneously open with the scissors. On the closing of the blades 22 for the severing of the cord C the clamps or clips B will simultaneously close and grip the cord at either side of the point of cut thereof so that the said cord will be closed against bleeding and this severance operation and the closing of the cord C are simultaneous with each other. By reason of the thickness of the cord C when the clips or clamps B are gripping the same the jaws 16 or 24 of the scissors A are freed from the mounting of these clips or clamps B thereon so that the clips are automatically released from the scissors and the latter free for withdrawal from operating position.

From the foregoing it is thought that the construction and manner of operation of the implement will be clearly understood and therefore a more extended explanation has been omitted. It is contemplated that changes, variations and modifications may be made in the invention which come properly within the scope of the claims hereinafter appended without departing from the spirit of the invention or sacrificing any of its advantages.

What is claimed is:

1. An implement of the character described, comprising scissors, extensions at opposite sides of the scissors, and spring clamps detachably carried by said extensions so that they will close on an umbilical cord for attachment thereto at both sides of the cut therein during the cutting operation and will become released from the extensions by the cutting operation of said scissors.

2. An implement of the character described comprising scissors, supports projecting laterally from the cutting end of the scissors beyond opposite sides of the latter, and detachable spring clamps carried by said supports and released by the cutting operation of the scissors so as to clamp severed ends of an umbilical cord.

WILLIAM B. CARROLL.